(12) United States Patent
McDevitt

(10) Patent No.: US 10,710,093 B2
(45) Date of Patent: Jul. 14, 2020

(54) MOBILE BULK MATERIAL PROCESSING APPARATUS WITH SLEWING CONVEYOR

(71) Applicant: SANDVIK INTELECTUAL PROPERTY AB, Sandviken (SE)

(72) Inventor: Terry McDevitt, Ballybofey (IE)

(73) Assignee: SANDVIK INTELLECTUAL PROPERTY, Sandviken (SE)

( * ) Notice: Subject to any disclaimer, the term of this patent is extended or adjusted under 35 U.S.C. 154(b) by 971 days.

(21) Appl. No.: 14/911,338

(22) PCT Filed: Jun. 26, 2014

(86) PCT No.: PCT/EP2014/063528
§ 371 (c)(1),
(2) Date: Feb. 10, 2016

(87) PCT Pub. No.: WO2015/022111
PCT Pub. Date: Feb. 19, 2015

(65) Prior Publication Data
US 2016/0193610 A1    Jul. 7, 2016

(30) Foreign Application Priority Data

Aug. 14, 2013    (EP) .................................... 13180378

(51) Int. Cl.
 *B02C 23/08* (2006.01)
 *B02C 21/02* (2006.01)
 *B65G 41/00* (2006.01)
(52) U.S. Cl.
 CPC ............ *B02C 21/026* (2013.01); *B02C 23/08* (2013.01); *B65G 41/005* (2013.01); *B65G 41/008* (2013.01)

(58) Field of Classification Search
 CPC ....... B02C 21/02; B02C 21/026; B02C 23/02; B02C 23/08; B65G 41/005; B65G 41/008; B65G 41/00; B65G 41/001–008
 USPC .......... 241/68, 71, 101.74; 198/861.1, 861.3, 198/313, 632, 581
 See application file for complete search history.

(56) References Cited

U.S. PATENT DOCUMENTS

| 440,480 | A | * | 11/1890 | Kruger | B02C 21/02 241/76 |
| 2,063,431 | A | * | 12/1936 | Grayson | F25C 5/046 198/364 |
| 3,700,383 | A | | 10/1972 | Boersma | |
| 3,768,784 | A | * | 10/1973 | Spellman, Jr. | B28C 5/4255 366/49 |
| 3,983,950 | A | * | 10/1976 | Fabian | B02C 21/02 180/24 |

(Continued)

FOREIGN PATENT DOCUMENTS

| AT | 388968 B | 9/1989 |
| CN | 101624138 A | 1/2010 |

(Continued)

*Primary Examiner* — Shelley M Shelf
*Assistant Examiner* — Smith Oberto Bapthelus
(74) *Attorney, Agent, or Firm* — Corinne R. Gorski

(57) ABSTRACT

A mobile bulk material processing apparatus includes a main frame to support a material processing unit. A conveyor extends from the main frame and is mounted on a pivot joint to allow the conveyor to slew relative to the main frame, the pivot joint being positioned above the conveyor that is suspended below a region of the main frame.

10 Claims, 9 Drawing Sheets

(56) References Cited

U.S. PATENT DOCUMENTS

| | | | | |
|---|---|---|---|---|
| 4,325,580 A * | 4/1982 | Swisher, Jr. | ............ | B28D 1/186 299/39.8 |
| 4,876,043 A * | 10/1989 | Hall, Sr. | ................. | B29C 31/10 264/39 |
| 4,903,780 A * | 2/1990 | Barbieri | ................. | B02C 21/02 172/108 |
| 4,997,135 A * | 3/1991 | Zehr | .................... | B02C 18/067 241/101.761 |
| 5,294,065 A * | 3/1994 | Harms | ...................... | B28C 9/04 241/101.76 |
| 5,419,502 A * | 5/1995 | Morey | ................. | B02C 18/067 241/101.761 |
| 5,460,332 A * | 10/1995 | Frick | ....................... | B02C 21/02 241/101.74 |
| 5,476,227 A * | 12/1995 | Tamura | ................. | B02C 21/026 241/101.74 |
| 5,580,004 A * | 12/1996 | Tamura | ................... | B02C 21/02 241/101.74 |
| 5,716,014 A * | 2/1998 | Tamura | ................. | B02C 18/142 241/101.74 |
| 5,730,373 A * | 3/1998 | Tamura | ................... | B02C 21/02 241/101.74 |
| 5,797,548 A * | 8/1998 | Tamura | ................... | B02C 13/30 241/101.74 |
| 5,803,376 A * | 9/1998 | Koyanagi | ............... | B02C 21/02 241/101.74 |
| 6,332,582 B1 * | 12/2001 | Ikegami | ................. | B02C 21/026 241/101.74 |
| 6,354,524 B1 * | 3/2002 | Nakayama | ............ | B02C 21/026 241/101.74 |
| 7,806,353 B2 * | 10/2010 | Douglas | ................. | B02C 21/02 241/101.74 |
| 7,942,353 B2 * | 5/2011 | Cerra | .................... | B02C 13/284 241/101.72 |
| 8,434,706 B2 * | 5/2013 | Davis | .................... | B02C 21/026 198/313 |
| 8,876,030 B2 * | 11/2014 | Hubrich | ................ | B02C 21/026 241/101.74 |
| 9,061,836 B2 * | 6/2015 | Horkko | ................. | B02C 21/026 |
| 9,193,537 B2 * | 11/2015 | Hannikainen | ......... | B02C 21/026 |
| 9,221,059 B2 * | 12/2015 | Blondin | ................ | B02C 21/026 |
| 9,539,578 B2 * | 1/2017 | McDevitt | ................ | B07B 1/005 |
| 2002/0044828 A1 * | 4/2002 | Olynyk | ................. | B02C 21/026 404/72 |
| 2006/0278744 A1 * | 12/2006 | Jabs | ........................ | B02C 12/02 241/71 |
| 2007/0007374 A1 * | 1/2007 | Smith | ....................... | B02C 1/14 241/101.74 |
| 2008/0245910 A1 * | 10/2008 | Ishikawa | ................ | B02C 17/16 241/68 |
| 2009/0189003 A1 * | 7/2009 | Kolleth | ................ | B02C 21/026 241/101.74 |
| 2011/0000992 A1 * | 1/2011 | Davis | .................... | B02C 21/026 241/101.74 |
| 2012/0018557 A1 * | 1/2012 | Hubrich | ................ | B02C 21/026 241/101.71 |
| 2013/0153699 A1 * | 6/2013 | Davis | .................... | B02C 21/026 241/101.74 |
| 2013/0341447 A1 * | 12/2013 | Blondin | ................ | B02C 21/026 241/101.71 |
| 2016/0193610 A1 * | 7/2016 | McDevitt | ............. | B02C 21/026 241/68 |
| 2016/0193611 A1 * | 7/2016 | McDevitt | ................ | B07B 1/005 198/313 |

FOREIGN PATENT DOCUMENTS

| | | | |
|---|---|---|---|
| EP | 0506812 B1 | 10/1997 | |
| GB | 2468966 A * | 9/2010 | ............ B07B 1/005 |
| GB | 2468966 A | 9/2010 | |
| RU | 2327522 C2 | 6/2008 | |
| WO | 95/12462 A1 | 5/1995 | |
| WO | 97/41971 A1 | 11/1997 | |
| WO | 02/26403 A1 | 4/2002 | |
| WO | 2004/018106 A1 | 3/2004 | |
| WO | 2004/087324 A1 | 10/2004 | |
| WO | 2005/099903 A1 | 10/2005 | |
| WO | 2012/110679 | 8/2012 | |

* cited by examiner

MOBILE BULK MATERIAL PROCESSING APPARATUS WITH SLEWING CONVEYOR

RELATED APPLICATION DATA

This application is a § 371 National Stage Application of PCT International Application No. PCT/EP2014/0635 filed Jun. 26, 2014 claiming priority of EP Application No. 13180378.5, filed Aug. 14, 2013.

FIELD OF INVENTION

The present invention relates to mobile bulk material processing apparatus and in particular, although not exclusively, to a conveyor assembly mounted at a main frame of the apparatus via a pivot joint that is positioned above the conveyor that is in turn suspended below a region of the main frame.

BACKGROUND ART

Mobile bulk material processing apparatus has been developed for a wide variety of applications including the processing of stone, minerals, construction materials and both domestic and industrial waste to generate smaller and/or size categorised aggregate for subsequent processing, use or disposal. For example, in both a quarry or clearance site environment, a mobile crusher is used to crush stone, rubble or site clearance material into smaller pieces. Typically, the crusher is provided with a hopper for receiving the bulk material and a discharge conveyor to transfer the processed and crushed material to a discharge location.

Mobile screening plants also utilise hoppers and discharge conveyors and function to separate the bulk material into one or more screened sized ranges e.g. sand, ballast and aggregate via a screen box unit. Both screening and crushing plants range in size to suit particular applications with smaller self-propelled screening and/or crushing plants being designed to be readily transportable from one site to another on for example a low loader or by being towed as a trailed vehicle. It is accordingly desirable for such processing plates to comprise operating components that can be readily adjusted between an operative (e.g. crushing or screening) mode and a transport mode. As such, a number of mobile processing plants have been proposed having moving components that can be easily adjusted between deployed and transport positions without interfering with one another both in use and during transportation.

Example transportable processing plants with folding or pivoting operative components are described in WO 95/12462; EP 0506812; WO 97/41971; WO 02/26403; WO 2004/018106 and WO 2005/099903.

It is very common for the discharge conveyor (mounted at the sides and rear of the plant) to be foldable or pivotally adjustable between the operative and transport positions to provide a compact unit for transport whilst allowing the plant to stockpile the processed material as far away as possible from the plant main body. WO 2012/110679 and U.S. Pat. No. 3,768,784 disclose distributing conveyor systems that are configured to pivot about a vertical axis to allow the distal end of the conveyor to slew through a wide angle range to allow distributed stockpiling at both the sides and rear of the processing plant. However, such existing apparatus comprises a pivot joint that is mounted below the conveyor which presents problems both during loading of the plant onto a transport trailer and when manoeuvring on site over uneven and rough ground due to the available ground clearance below the pivot joint. Accordingly, what is required is a mobile processing plant that addresses these problems.

SUMMARY OF THE INVENTION

It is an objective of the present invention to provide a mobile bulk material processing plant that may be conveniently manoeuvred over rough ground and to be operable in relatively restricted zones or environments. In particular, a specific objective is to provide a mobile processing plant having a discharge conveyor that is configured with a maximum clearance above the ground and that may be readily moved between operative and transport positions. It is a further objective to provide a plant with a conveyor arrangement configured to allow access to otherwise obstructed regions of the plant for maintenance and servicing.

Accordingly, the inventors provide a processing plant having a discharge conveyor that is suspended below a conveyor support region of a main frame of the plant. In particular, the conveyor system of a subject invention comprises a pivot joint, in the form of a turntable or slew ring, that is suspended below a region of the plant main frame to allow the conveyor to slew through 180° without being inhibited by ground level obstructions and to allow the plant to be manoeuvred over rough ground to access restricted regions. Moreover, the present mobile processing plant comprises a discharge conveyor mounted at the main frame via an additional linear coupling to allow the conveyor unit to move backwards and forwards along the length of the main frame so as to expose otherwise obstructed regions of the plant including in particular the main frame region that mounts the primary processing unit (e.g. crusher and/or screening unit), power unit and other important drive and operative components.

Advantageously, the present conveyor comprises a pivotally mounted head and tail section to allow the conveyor to bend or fold between the transport and operative positions and in particular to allow the conveyor to be stowed between regions of the plant and the main frame so as to protect the conveyor during transport. This is achieved by configuring the main frame with two opposed parallel beams in which the space between the beams is suitable to accommodate the entire or a region of the conveyor.

According to a first aspect of the present invention there is provided mobile bulk material processing apparatus comprising: a main frame mounted or supported such that a conveyor support region of the frame is suspended above the ground; a conveyor for transporting material to or from a material processing unit at the apparatus; a pivot joint to couple the conveyor to the support region of the main frame such that the conveyor is capable of pivoting to change a position of a distal end of the conveyor relative to the main frame; characterised in that: the pivot joint is positioned above the conveyor to suspend the conveyor below the support region of the main frame.

Preferably, the apparatus further comprises a linear coupling to mount the pivot joint at the support region of the main frame, the linear coupling configured to provide linear movement of the conveyor along the support region of the main frame. As the entire conveyor is suspended from the main frame, the linear coupling is provided at a raised or elevated position well above the ground (to avoid any possible contact with the ground) to facilitate plant manoeuvrability. Optionally, the linear coupling comprises at least one track or rail mounted at the frame, the pivot joint configured to move along the track or rail. Optionally, the linear coupling may comprise any manner of linear actuator, such as a power operated linear actuator or ram to drive the linear movement of the conveyor in the longitudinal axis direction of the main frame. The moving components of the linear coupling may comprise wheels, runners, one or a plurality of guide rails or tracks. Linear actuation may also be provided by a rack and pinion or turn screw arrangements.

Preferably, the linear coupling comprises a bracket extending upwardly from the pivot joint and having at least one uppermost end region to contact the track or rail such that the bracket is configured to move along the track or rail. Preferably, the linear coupling further comprises a second bracket (or conveyor support frame) extending downwardly from the pivot joint, the second bracket pivotally mounted to a region of the conveyor.

Preferably, the main frame comprises a longitudinal axis extending between a first forward end and a second rearward end of the main frame, the processing unit positioned between the first and second ends; wherein the conveyor is a discharge conveyor mounted towards the first end to discharge processed material from the processing unit.

Preferably, the pivot joint is capable of linear movement in a direction of the longitudinal axis towards and away from the first end and/or a central region of the main frame that supports the primary processing unit. It is advantageous to allow the conveyor to slew at any linear position along the length of the main frame both during operation and to facilitate maintenance access.

Preferably, the support region of the main frame comprises a pair of opposed beams (or arms) extending in the longitudinal axis direction and spaced apart in a direction perpendicular to the longitudinal axis to accommodate at least a part of the conveyor between the opposed beams when the conveyor is aligned with the longitudinal axis. Accommodating at least a part of the conveyor between the opposed beams is advantageous to both protect the conveyor during transport and to allow the processing plate to be conveniently loaded and transported on a transportation trailer that, in turn, may offer additional protection during transport due to the convenient way in which the present plant may be loaded and carried at the trailer.

To allow the conveyor to slew 180° between the lateral sideways deployed positions, an axis of the pivot joint is aligned substantially vertically when the apparatus is mounted or suspended on level ground. That is, a base plate that mounts the slew ring or turntable is aligned substantially horizontally, when the plant is arranged on level ground.

Optionally, the primary processing unit of the present plant may comprise a crusher and/or a screening unit. Additionally, the plant may comprise endless tracks or wheels to support the frame of the plant movably on the ground.

Preferably, the conveyor comprises a support structure to mount an endless belt or carriage member configured to support and transport the material relative to the main frame wherein the pivot joint is mounted between the belt or carriage member and the support region of the frame. Moreover, the conveyor further comprises a head and tail section pivotally mounted together to allow the head to bend or fold relative to the tail to raise and lower the distal end of the conveyor relative to the support region of the main frame.

Optionally, the apparatus further comprises a plurality of power operated linear actuators to drive bending or folding of the head section relative to the tail section (or the main frame) and/or the tail section relative to the main frame. The linear actuators may comprise hydraulic rams arranged in sets or pairs to act on both the head and tail sections independently to provide independent raising and lower movement of the head and tail sections relative to the plant main frame. This is advantageous to maximise the adjustability of the conveyor and to reduce the time required for manipulation between the transport and operational positions.

Preferably, the apparatus further comprises a conveyor mount frame to suspend the support structure from the turntable or slew ring. Optionally, the conveyor further comprises a guard (to protect a lower region of the conveyor) and a conveyor hopper to receive and feed processed material onto the belt.

According to the preferred embodiment, the pivot joint is positioned between a region of the conveyor and the support region of the plant frame in the vertical direction. In particular, the slew ring or turntable is positioned between the conveyor belt and the support region of the main frame in the vertical direction.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
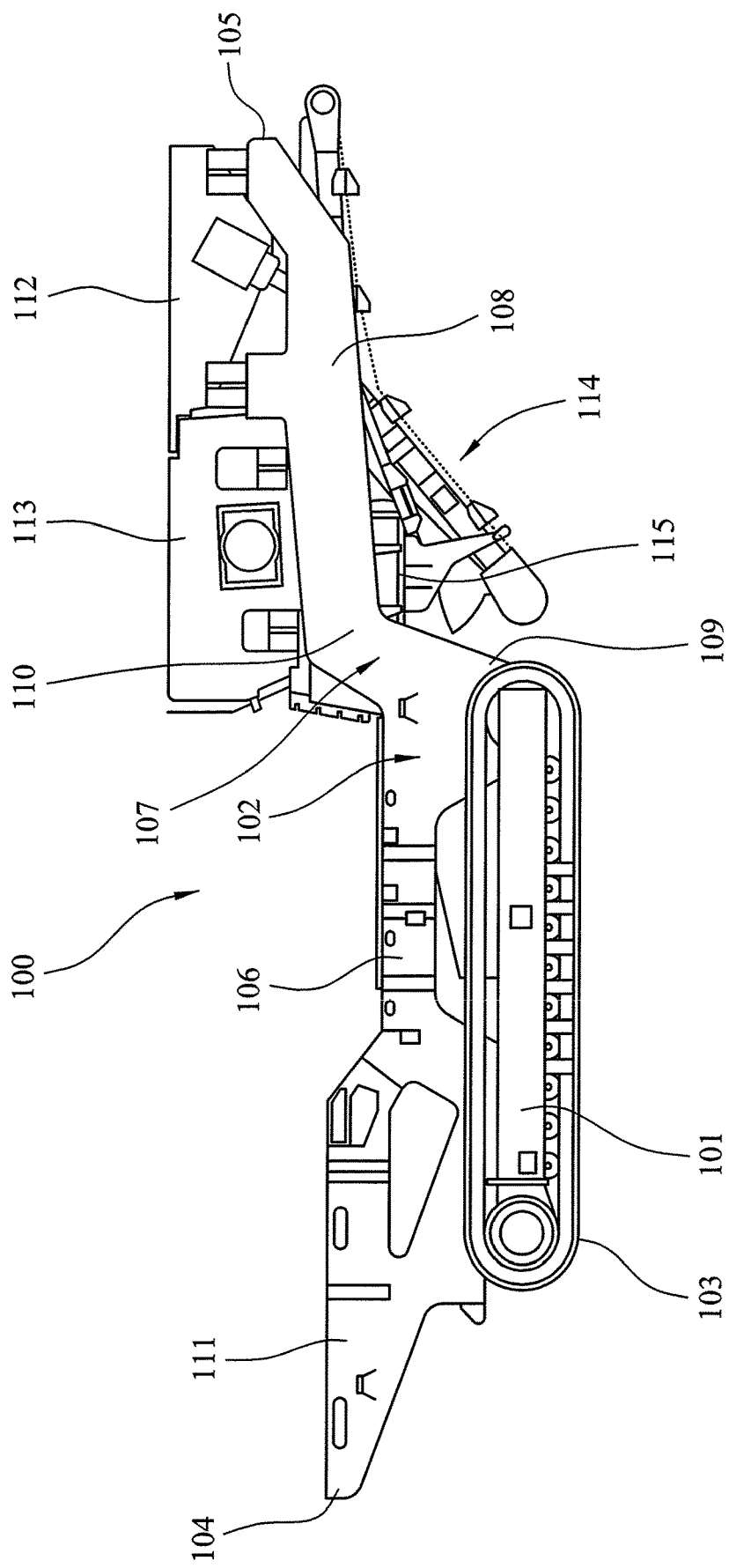
FIG. 1 is a side view of selected components of a mobile bulk material processing plant having a distribution conveyor suspended from below a region of a main frame (or chassis) according to a specific implementation of the present invention.
Figure 2:
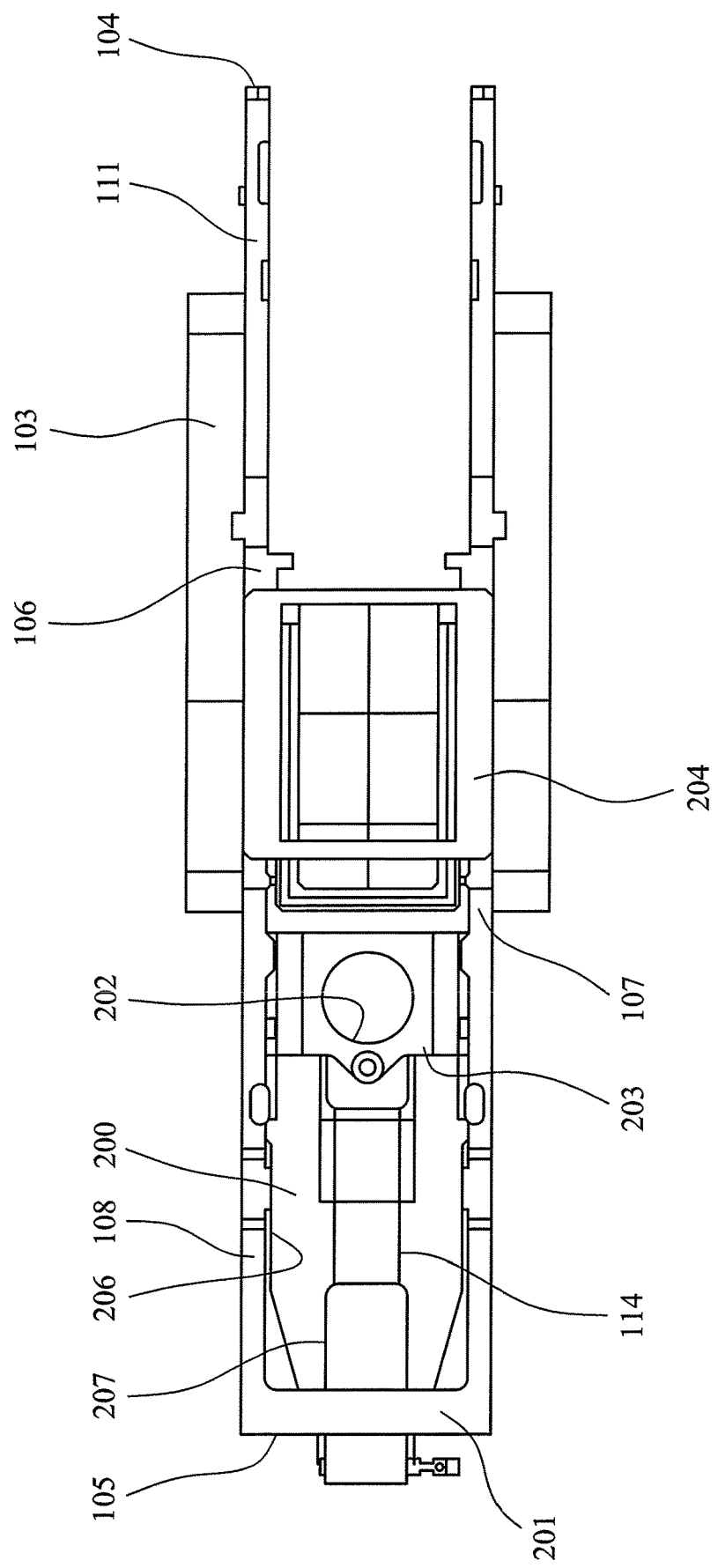
FIG. 2 is a plan view of the plant of FIG. 1 with selected components removed for illustrative purposes.
Figure 3:
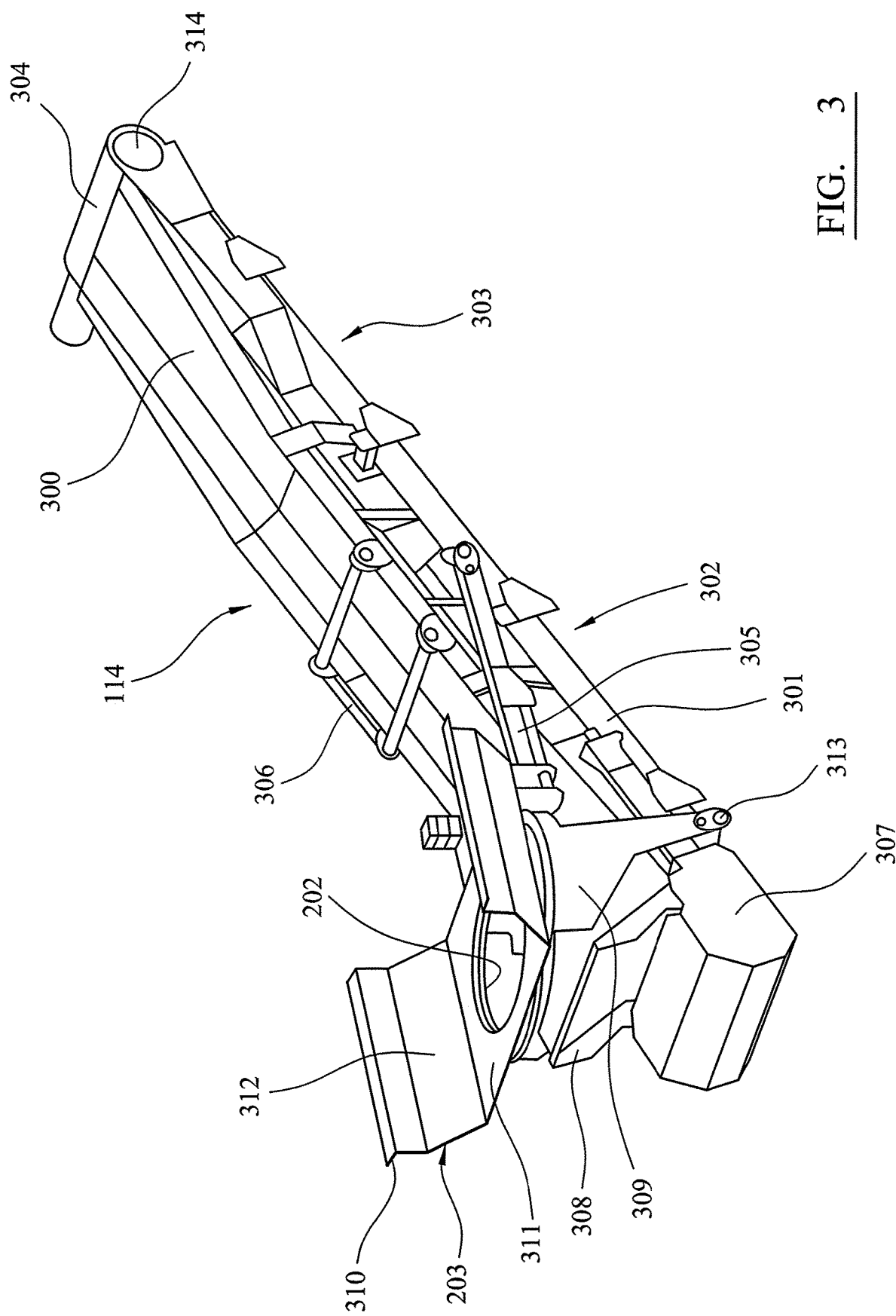
FIG. 3 is a perspective view of the discharge conveyor of the plant of FIG. 1 according to a specific implementation of the present invention.

Referring to FIGS. 1 and 2, a mobile processing plant 100 comprises a main frame (or chassis) 102 that provides a central support for the various operative components of the plant 100. Frame 102 is movably mounted on the ground via an undercarriage 101 that carries a pair of opposed endless tracks 103 that are driven by a suitable power unit (not shown) to propel plant 100 over the ground. Frame 102 comprises a pair of parallel and longitudinally extending frame members that extend from a forward end 105 to a rearward end 104. Each frame member is spaced apart in a widthwise direction perpendicular to the main length between ends 105, 104. A central frame region 106 provides support for a mount 204 to mount the power unit and a primary plant processing unit (not shown). As will be appreciated, the processing unit may comprise a crusher such as a gyratory, impact, vibration or jaw crusher. Alternatively or in addition, the main processing unit may comprise a screening unit or a series of screening units configured to separate bulk material into various size distributions. The crusher and/or screening unit is typically provided with a hopper (not shown) for receiving the bulk material from a supply conveyor (not shown) mounted at a rearward region 111 of frame 102 towards the second and rearward end 104.

A forwardmost region of frame 102 (being similar in construction and configuration to central and rearward regions 106, 111) comprises a pair of parallel longitudinally extending beam 108 spaced apart in the widthwise direction of plant 100. Accordingly, a space or gap 200 is created between the opposed inward facing surfaces 206 of beams 108. Beams 108 are structurally stabilised and supported by a crossbeam 201 extending between the opposed faces 206 at the forward end 105. When plant 100 is positioned on level ground as shown in FIG. 1, beams 108 extend from central region 106 to be aligned almost horizontally above the ground. According to the specific implementation, beams 108 are inclined upwardly by a small angle from a neck region 107 of frame 102. Neck 107 extends upwardly from central region 106 and comprises a lower section 109 (provided that the transition or junction between neck 107 and central region 106) and a corresponding upper section 110 (provided at the transition or junction between neck 107 and beam 108). Accordingly, each longitudinally extending parallel frame member 102 comprises a respective neck region 107 such that each beam 108 is positioned vertically higher than central region 106 to be suspended above the ground and to provide adequate clearance at the region directly below beams 108 to accommodate a part of a discharge conveyor 114. Beams 108 provide a mount for a primary feeder unit 112 and a sieve or screener unit 113 that extend upwardly from beams 108 (and are removed from FIG. 2 for illustrative purposes).

Figure 4:
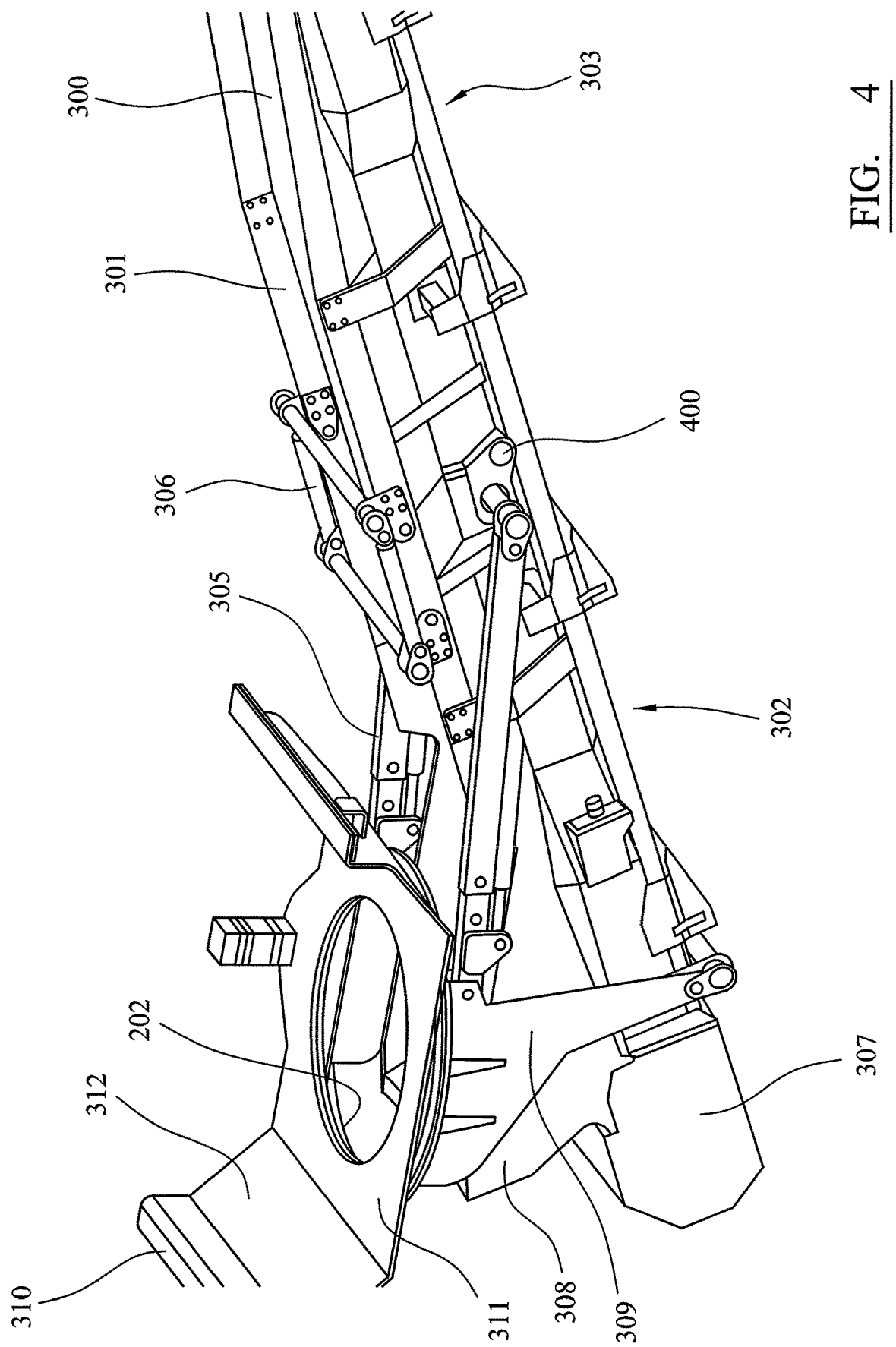
FIG. 4 is a magnified view of a lower region of the discharge conveyor of FIG. 3.

Conveyor 114 is mounted at and suspended below beams 108 via a pivot joint indicated generally by reference 115 that is coupled (via a first upper part) to beams 108 and (via a second lower part) to conveyor 114. Referring to FIG. 2, pivot joint 115 comprises a rotatable slew ring 202 rotatably mounted within a first bracket 203 that is coupled to beams 108. In particular, bracket 203 comprises a base plate 311 (that mounts slew ring 202) and a pair of opposed side walls 312 that project upwardly from each lateral side of base plate 311. Each side wall 312 is terminated at its uppermost end by an elongate runner 310 comprising a low friction liner. Accordingly, side walls 312 and runners 310 are positioned upwardly from slew ring 202. A second bracket 309 projects downwardly from base plate 311 and slew ring 202 and provides a support frame for conveyor 114. Accordingly, conveyor 114 is suspended from beams 108 via first and second brackets 203, 309. Second bracket 309 is attached via a pivot mounting 313 at a lowermost end of conveyor 114 furthest from an uppermost discharge distal end 304. Conveyor 114 further comprises a support frame structure 301 that carries an endless belt 300 drivable over a plurality of rollers 314 to carry and discharge material processed by unit 113. Support frame 301 is divided into a uppermost head section 303 and a lowermost tail section 302 pivotally coupled to one another via a pivot coupling 400 (illustrated in FIG. 4). A first pair of hydraulic actuators 305 extend between second bracket 309 and an uppermost end region of the tail section 302. A second pair of hydraulic actuators 306 are mounted between the support frame 301 of the head 303 and tail 302 sections at the region of pivot coupling 400. Accordingly, tail section 302 is capable of being displaced and effectively raised and lowered relative to second bracket 309 via actuators 305 whilst head section 303 may be raised and lowered relative to tail section 302 via actuators 306. In particular, pivot coupling 400 and pivot mount 313 comprise respective pivot axes that are aligned substantially perpendicular to a pivot axis of the slewing coupling 115. This configuration provides the desired movement of the end region 304 of the conveyor in the vertical (raising and lowering) plane and the horizontal (slewing) plane. Conveyor 114 further comprises a guard 307 (to protect the lowermost end of conveyor frame 301) and a conveyor hopper 308 (to feed material from screener unit 113 onto belt 300).

Figure 5:
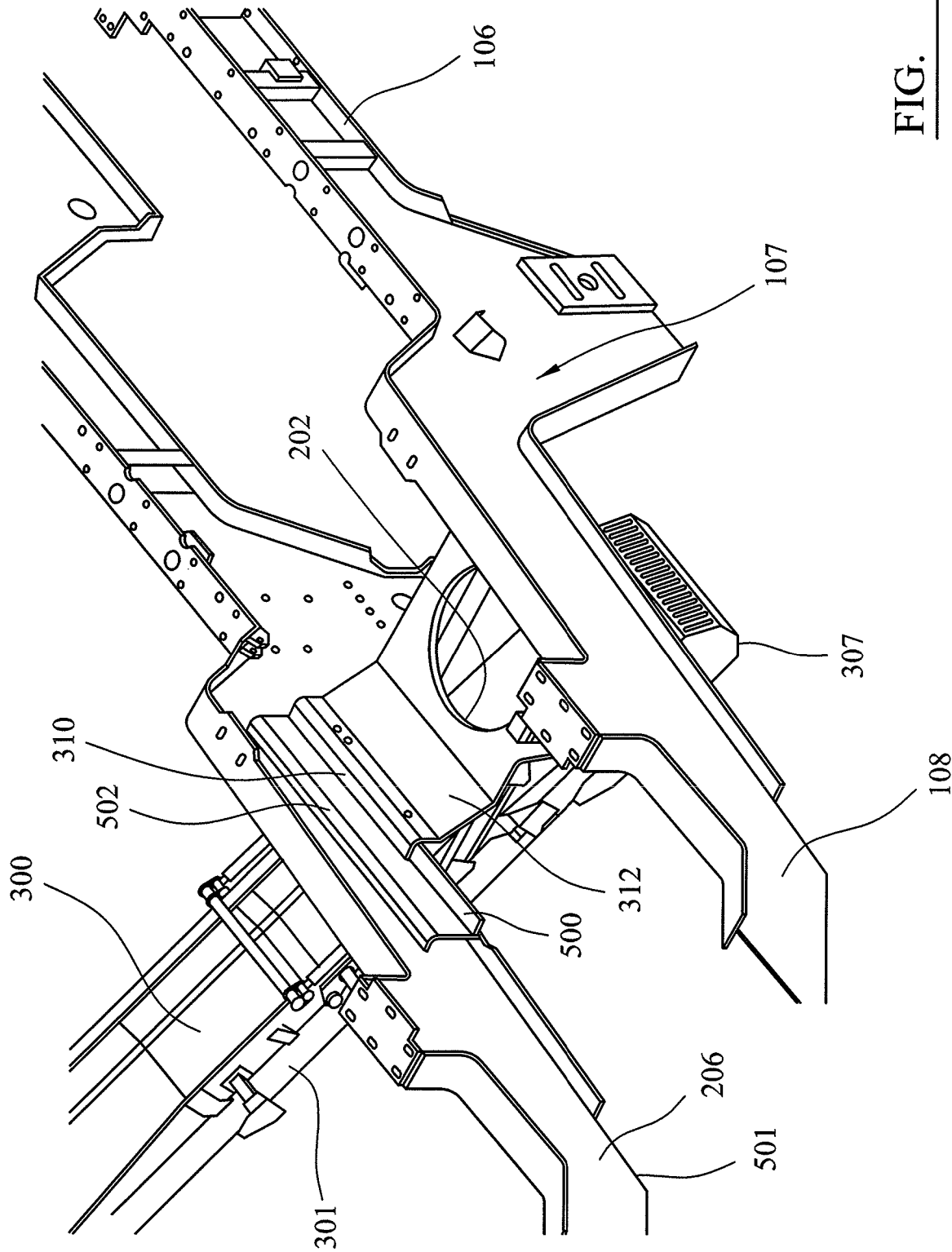
FIG. 5 is a perspective view of the discharge conveyor of FIG. 3 mounted at the main frame via a pivot joint and a separate linear coupling according to a specific implementation of the present invention.

Referring to FIG. 5 and as illustrated in FIG. 1, conveyor 114 is suspended below beams 108 that represent a conveyor support region of plant main frame 102. That is, first bracket 203 is coupled to each inward facing surfaces 206 of beams 108 such that runners 310 sit between beams 108 within space 200. Accordingly, bracket side walls 312 project downwardly from beams 108 to suspend base plate 311 vertically below beams 108. Accordingly, slew ring 202 is suspended below a lowermost downward facing surface 501 of beams 108. A linear coupling, in the form of a pair of elongate members 502 are respectively secured to the inward facing surface 206 of each beam 108. Each linear member 502 comprises a longitudinally extending rail 500 that projects inwardly into space 200 between the inward facing surfaces 206. Runners 310 are configured to sit on top of each respective rail 500 such that the low friction runners 310 can slide along each rail 500 to allow bracket 203 (an in particular slew ring 202) to slide longitudinally along beams 108 towards and away from frame central region 106. This sliding action is driven by one or a plurality of power operated linear actuators or rams (not shown).

Figure 6:
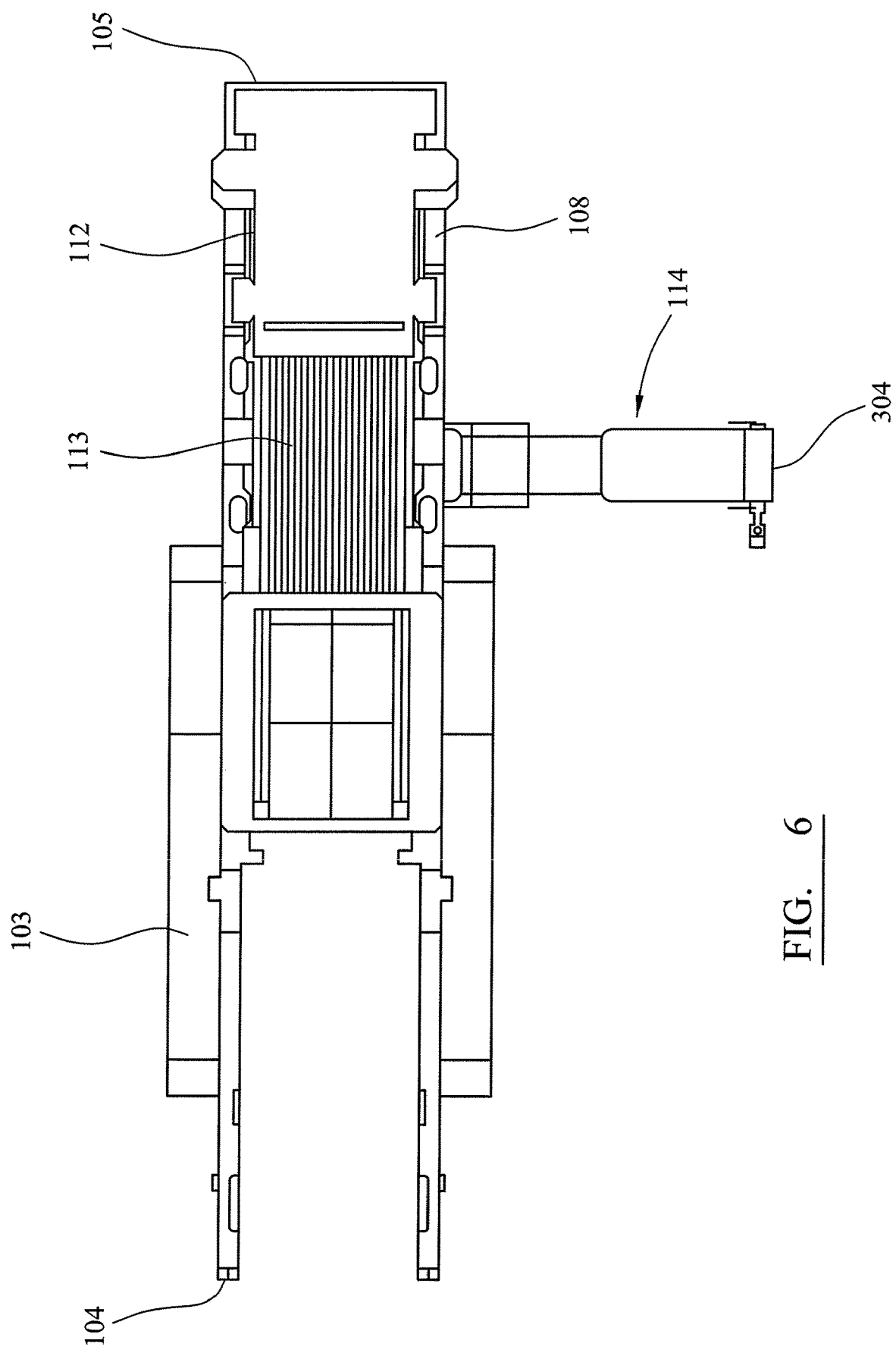
FIG. 6 is a plan view of the plant of FIG. 2 with the discharge conveyor slewed through 90° to extend laterally to the side of the plant at a rearwardmost position of the main frame.

As conveyor 114 is suspended from beams 108 via first and second brackets 203, 309 (pivotally coupled to one another via slew ring 202) the tail 302 and head 303 sections are capable of slewing through 180° between the extreme side positions (the right side position being illustrated in FIG. 6) where conveyor 114 projects laterally to one side of, and being aligned perpendicular to, the longitudinally extending frame 102. In the configuration of FIG. 6, conveyor 114 is configured to stockpile discharged material to a plurality of different positions at either side of frame 102 and beyond the plant forward end 105.

Figure 7:
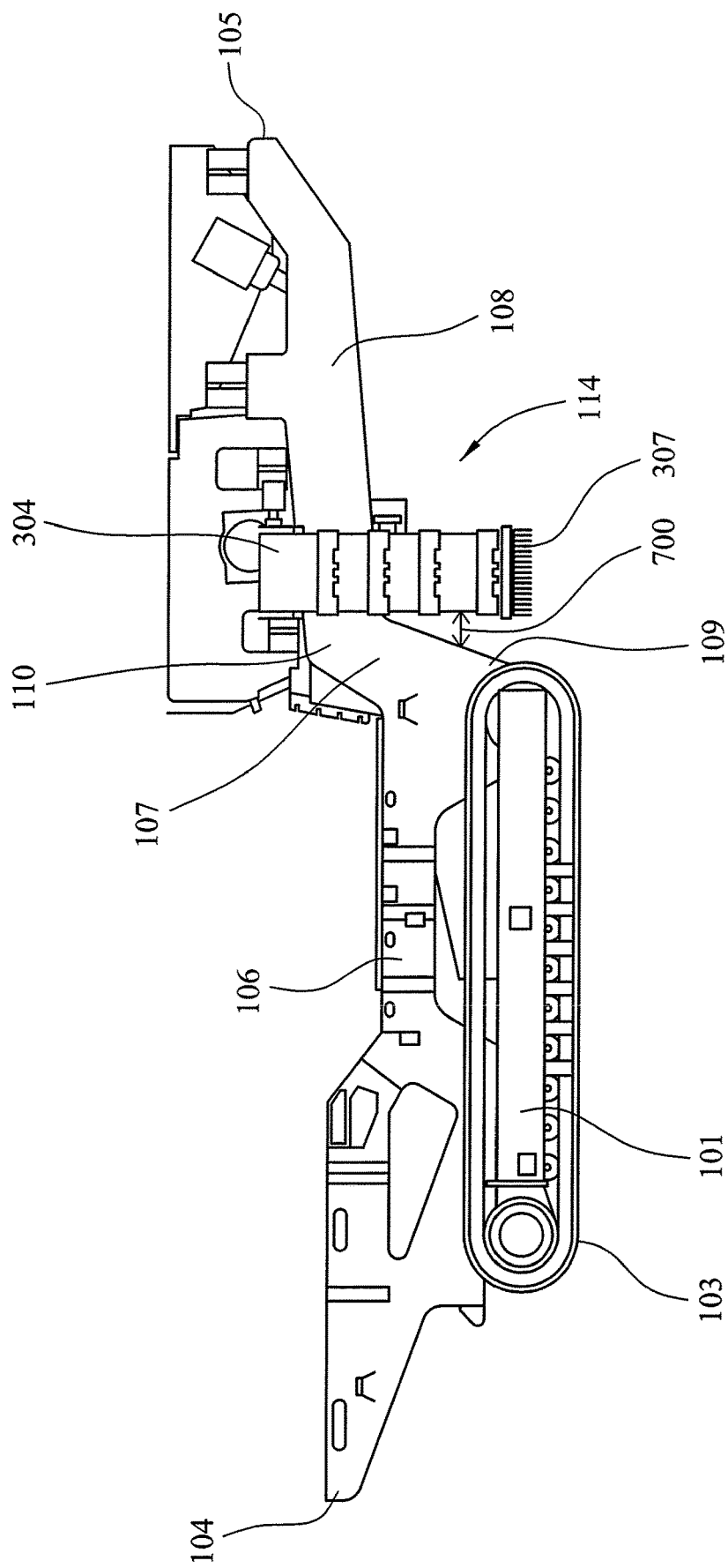
FIG. 7 is a side view of the plant of FIG. 6 with the discharge conveyor slewed through 90° to extend laterally to the side of the plant at the rearwardmost position of the main frame.
Figure 8:
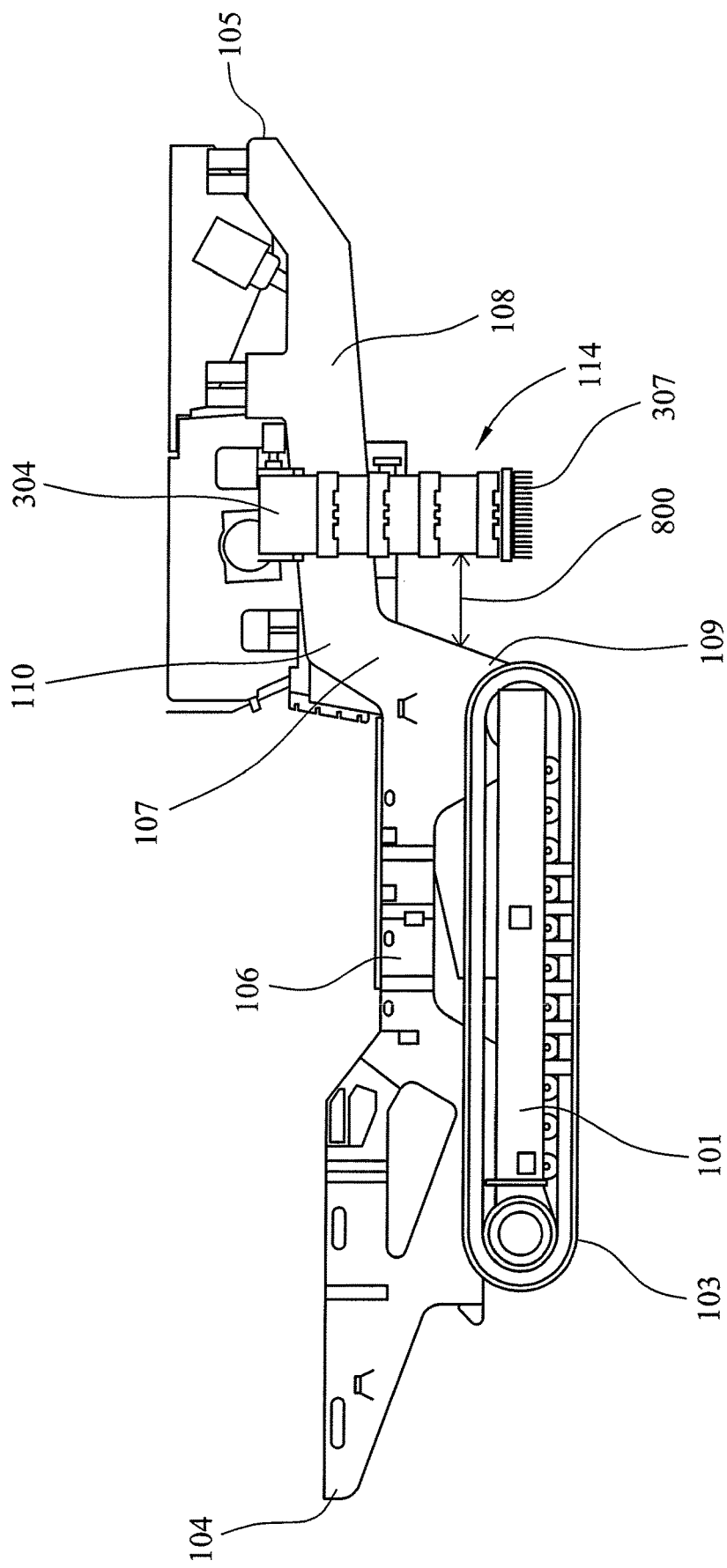
FIG. 8 is a further side view of the plant of FIG. 7 with the discharge conveyor moved in the longitudinal axis direction away from a central region to a forwardmost position at the main frame.

Referring to FIGS. 7 and 8, via sliding movement of runners 310 along rails 500, the entire conveyor assembly 114 is capable of being linearly displaced towards and away from neck section 107. FIG. 7 illustrates the general operative position of conveyor 114 separated from neck 107 by a relatively short linear distance 700. FIG. 8 illustrates conveyor 114 displaced forwardly towards end 105 and away from neck 107 so as to provide a relatively greater separation distance 800 between conveyor 114 and neck section 107. This is advantageous to provide repair or maintenance access to this region of plant 100.

Figure 9:
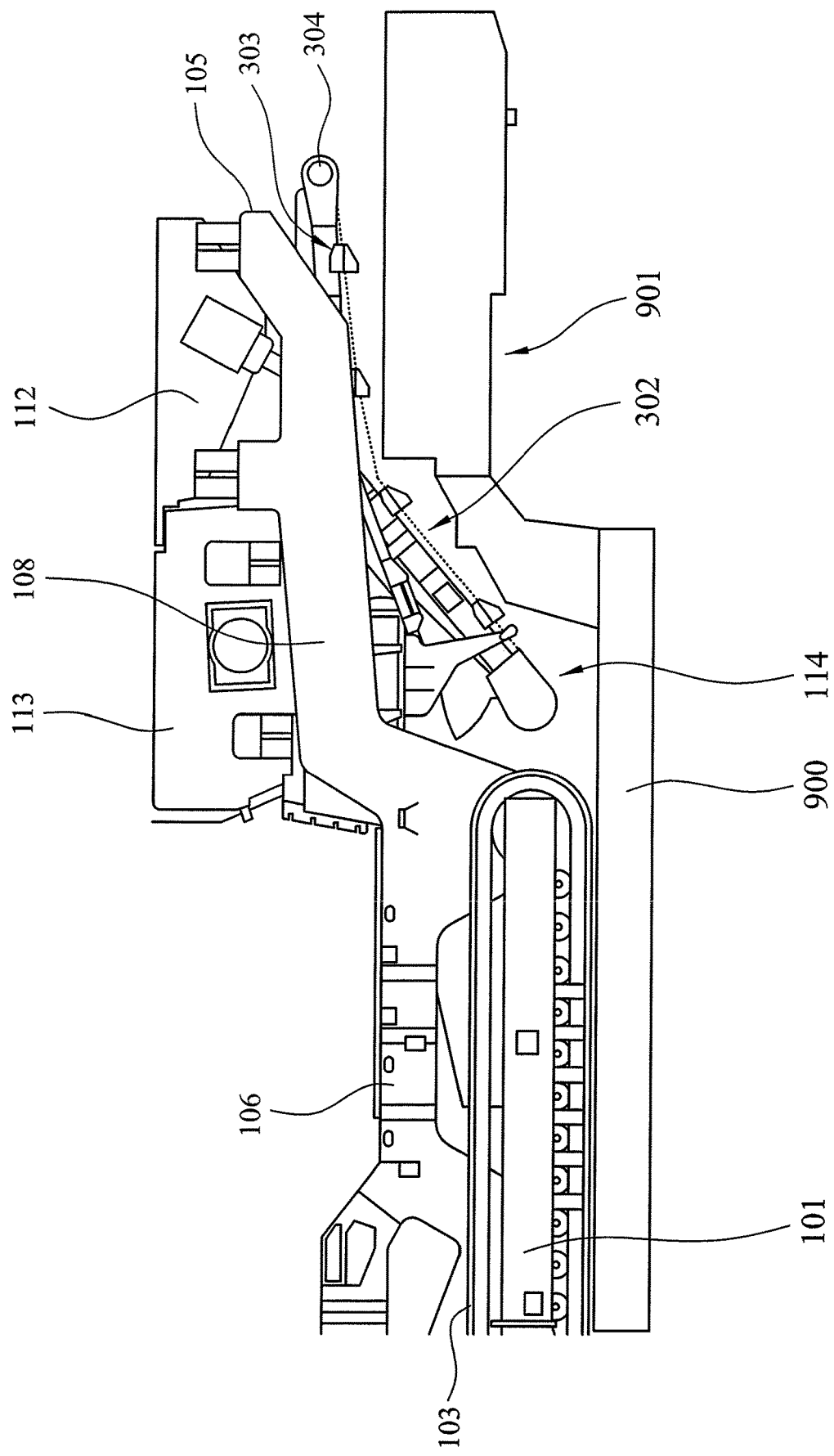
FIG. 9 is a side elevation view of the plant of FIG. 1 with the conveyor positioned or stowed between a region of the main frame for loading and transport upon a low-loading trailer.

Advantageously, the space 200 between beams 108 is configured to receive and accommodate at least the head section 303 of conveyor 114 in a transport or stowed position. That is, the lateral sides 207 of head section 303 in the transport configuration of FIGS. 1 and 9 are positioned opposed to the inward facing surfaces 206 of beams 108. Accordingly, the head section 303 is almost completely accommodated within space 200 between the opposed beams 108. Crossbeam 201 is positioned at an uppermost region of beams 108 such that the conveyor distal end 304 is positioned below beam 201 and does not obstruct the encapsulation of head section 303 between the frame beams 108. According to the specific implementation, conveyor end 304 projects forwardly from beam end 105. To manipulate conveyor 114 from the transport position of FIGS. 1 and 9 to the operative positions of FIGS. 6 to 8, hydraulic rams 305, 306 are actuated to lower the head and tail sections 303, 302 such that conveyor frame 301 and belt 300 are lowered vertically below beams 108. Head and tail sections 303, 302 may then be slewed through 90° to the left or right via pivot joint 115. As illustrated in FIG. 9, the encapsulation of a least the head section 303 within plant frame 102 allows the plant 100 to be conveniently installed on a low-loader trailer 900 with the forwardmost end 105 positioned vertically above the raised articulating section 901 of the low loader. This is to be contrasted with conventional plant arrangements where the entire plant must be loaded onto trailer 900 in the opposite rearward direction. Accordingly, conveyor 114 is both protected by the transport vehicle and by the beams 108 during transport.

Additionally, by suspending the entire conveyor 114 below the beams 108, the clearance of guard 307 above the ground can be maximised to facilitate manoeuvrability of the plant 100 over rough terrain. Additionally, suspending conveyor 114 from frame 102 enables the linear sliding actuation of the conveyor assembly 114 (as illustrated in FIGS. 7 and 8) to provide maintenance access to otherwise obstructed regions of the plant 100.

The invention claimed is:

1. A mobile bulk material processing apparatus comprising:
    a main frame mounted or supported such that a conveyor support region of the main frame is suspended above the ground, wherein the main frame includes a longitudinal axis extending between a first forward end and a second rearward end of the main frame;
    a conveyor for transporting material to or from the material processing apparatus, the support region of the main frame including a pair of opposed beams extending in the longitudinal axis direction and spaced apart in a direction perpendicular to the longitudinal axis to accommodate part of the conveyor between the opposed beams when the conveyor is aligned with the longitudinal axis, wherein the conveyor includes a head and tail section pivotally mounted together to allow the head to bend or fold relative to the tail to raise and lower a distal end of the conveyor relative to the support region of the main frame;
    a pivot joint coupling the conveyor to the conveyor support region of the main frame such that the conveyor is arranged to pivot to change a position of the distal end of the conveyor relative to the main frame, wherein the pivot joint is positioned above the conveyor to suspend the conveyor below the support region of the main frame; and
    a linear coupling mounting the pivot joint at the support region of the main frame, the linear coupling being configured to provide linear movement of the conveyor along the conveyor support region of the main frame, wherein the linear coupling includes at least one track or rail mounted at the main frame, the pivot joint being configured to move along the track or rail.

2. The apparatus as claimed in claim 1, wherein the linear coupling includes a bracket extending upwardly from the pivot joint and having at least one uppermost end region arranged to contact the track or rail such that the bracket is configured to move along the track or rail.

3. The apparatus as claimed in claim 1, wherein the conveyor is a discharge conveyor mounted towards the first end to discharge processed material.

4. The apparatus as claimed in claim 3, wherein the pivot joint moves linearly in a direction of the longitudinal axis towards and away from the first end.

5. The apparatus as claimed in claim 1, wherein the pivot joint includes a turntable or a slew ring.

6. The apparatus as claimed in claim 1, wherein an axis of the pivot joint is aligned substantially vertically when the apparatus is mounted or suspended on level ground.

7. The apparatus as claimed in claim 1, further comprising endless tracks or wheels movably supporting the main frame on the ground.

8. The apparatus as claimed in claim 1, wherein the conveyor includes a support structure arranged to mount an endless belt or carriage member configured to support and transport the material relative to the main frame, the pivot joint being mounted between the belt or carriage member and the support region of the main frame.

9. The apparatus as claimed in claim 1, further comprising a plurality of power operated linear actuators arranged to drive bending or folding of the head section and/or the tail section.

10. The apparatus as claimed in claim 8, further comprising a conveyor mount frame to suspend the support structure from a turntable or slew ring of the pivot joint.

* * * * *